(12) United States Patent
Chiang (10) Patent No.: US 11,529,906 B1
(45) Date of Patent: *Dec. 20, 2022

(54) VEHICLE REARVIEW MIRROR ASSEMBLY

(71) Applicant: Nan-Hsin Chiang, Changhua County (TW)

(72) Inventor: Nan-Hsin Chiang, Changhua County (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/738,900

(22) Filed: May 6, 2022

(51) Int. Cl.
| | |
|---|---|
| *B60R 1/12* | (2006.01) |
| *F21S 43/239* | (2018.01) |
| *B60Q 1/26* | (2006.01) |
| *F21V 3/04* | (2018.01) |
| *F21S 43/242* | (2018.01) |

(52) U.S. Cl.
CPC .......... *B60R 1/1207* (2013.01); *B60Q 1/2665* (2013.01); *F21S 43/239* (2018.01); *F21S 43/242* (2018.01); *F21V 3/049* (2013.01)

(58) Field of Classification Search
CPC .... B60Q 1/2665; F21S 43/242; F21S 43/239; F21V 3/049; B60R 1/1207
USPC .................................................. 362/494, 510
See application file for complete search history.

(56) References Cited

U.S. PATENT DOCUMENTS

| | | | | |
|---|---|---|---|---|
| 7,771,062 | B2 * | 8/2010 | Kuhn | B60R 1/12 |
| | | | | 362/494 |
| 10,589,675 | B1 * | 3/2020 | Huang | F21S 43/239 |
| 11,407,360 | B1 * | 8/2022 | Huang | G02B 6/0036 |
| 2017/0136953 | A1 * | 5/2017 | Tseng | B60R 1/1207 |
| 2020/0298760 | A1 * | 9/2020 | Huang | G02B 6/0041 |
| 2021/0213874 | A1 * | 7/2021 | Chang | B60Q 1/2665 |

* cited by examiner

*Primary Examiner* — Laura K Tso
(74) *Attorney, Agent, or Firm* — Muncy, Geissler, Olds & Lowe, P.C.

(57) ABSTRACT

A vehicle rearview mirror assembly is provided, including: a casing including a first shell body and a mounting board having an attachment portion with an aperture; a mirror attached to the mounting board and including a light-penetrable patterned portion spatially corresponding to the aperture; a light emitting module mounted to the attachment portion and including a second shell body, a light guide and a light source, the second shell body including an insertion slot therethrough, the light source being inserted through the insertion slot and engaged within the second shell body, and a binding member securing the light emitting module to the second shell body and sealing the insertion slot.

20 Claims, 7 Drawing Sheets

VEHICLE REARVIEW MIRROR ASSEMBLY

BACKGROUND OF THE INVENTION

Field of the Invention

The present invention relates to a vehicle rearview mirror assembly.

Description of the Prior Art

Driving safety is very important, so most vehicles are equipped with a safety assistance system, such as blind spot monitoring system. Generally speaking, the warning part of the blind spot monitoring system is installed in the rearview mirror assembly, for example, the light emitted by the light emitting device passes through the mirror of the rearview mirror assembly, to provide the warning signal, which compensates the visual blind spots of vehicle to ensure driving safety.

LEDs (light emitting diodes) are usually as the light emitting members in the warning part of the blind spot monitoring system. However, the LEDS are linear light sources only applicable to a small-area light-penetrable patterned portion of the mirror of the rearview mirror assembly, but inapplicable to a light-penetrable patterned portion with a large area or a customized pattern, which is much limited in applications.

The present invention is, therefore, arisen to obviate or at least mitigate the above-mentioned disadvantages.

SUMMARY OF THE INVENTION

The main object of the present invention is to provide a vehicle rearview mirror assembly which can show a customized pattern with a larger area and provides good reliability and durability.

To achieve the above and other objects, a vehicle rearview mirror assembly is provided, including: a casing including a first shell body and a mounting board, the first shell body having a first opening, the mounting board including an attachment portion, the mounting board being connected to the first shell body and covering the first opening, the attachment portion including an aperture; a mirror attached to a side of the mounting board opposite to the first opening, and including a light-penetrable patterned portion spatially corresponding to the aperture; a light emitting module mounted to the attachment portion and including a second shell body, a light guide and a light source, the second shell body including a rear portion which includes an inner surface facing toward the aperture and a second opening, the light guide being connected to the second shell body and covering the second opening, the inner surface including a reflection surface which faces the light guide, the light guide including a prismatic surface facing the reflection surface, the rear portion further including an annular wall which is located adjacent to a bottom of the second shell body and defines an insertion slot through the rear portion, the light source including a circuit board and at least one light emitting member disposed on the circuit board and facing away from the bottom of the second shell body, the circuit board being inserted through the insertion slot and engaged within the annular wall, and a binding member securing the circuit board to the annular wall and sealing the insertion slot.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
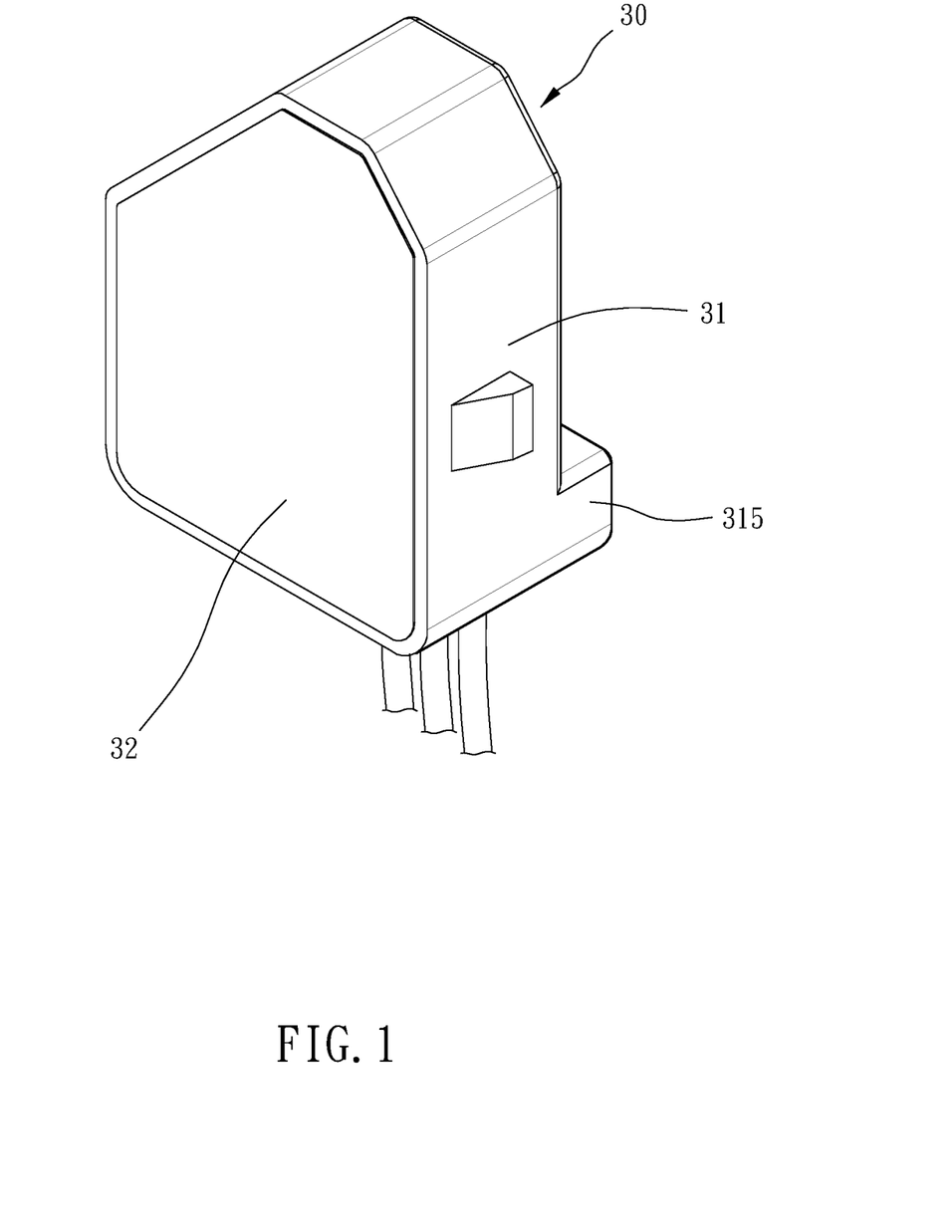
FIG. 1 is a stereogram of a light emitting module of a preferable embodiment of the present invention.
Figure 2:
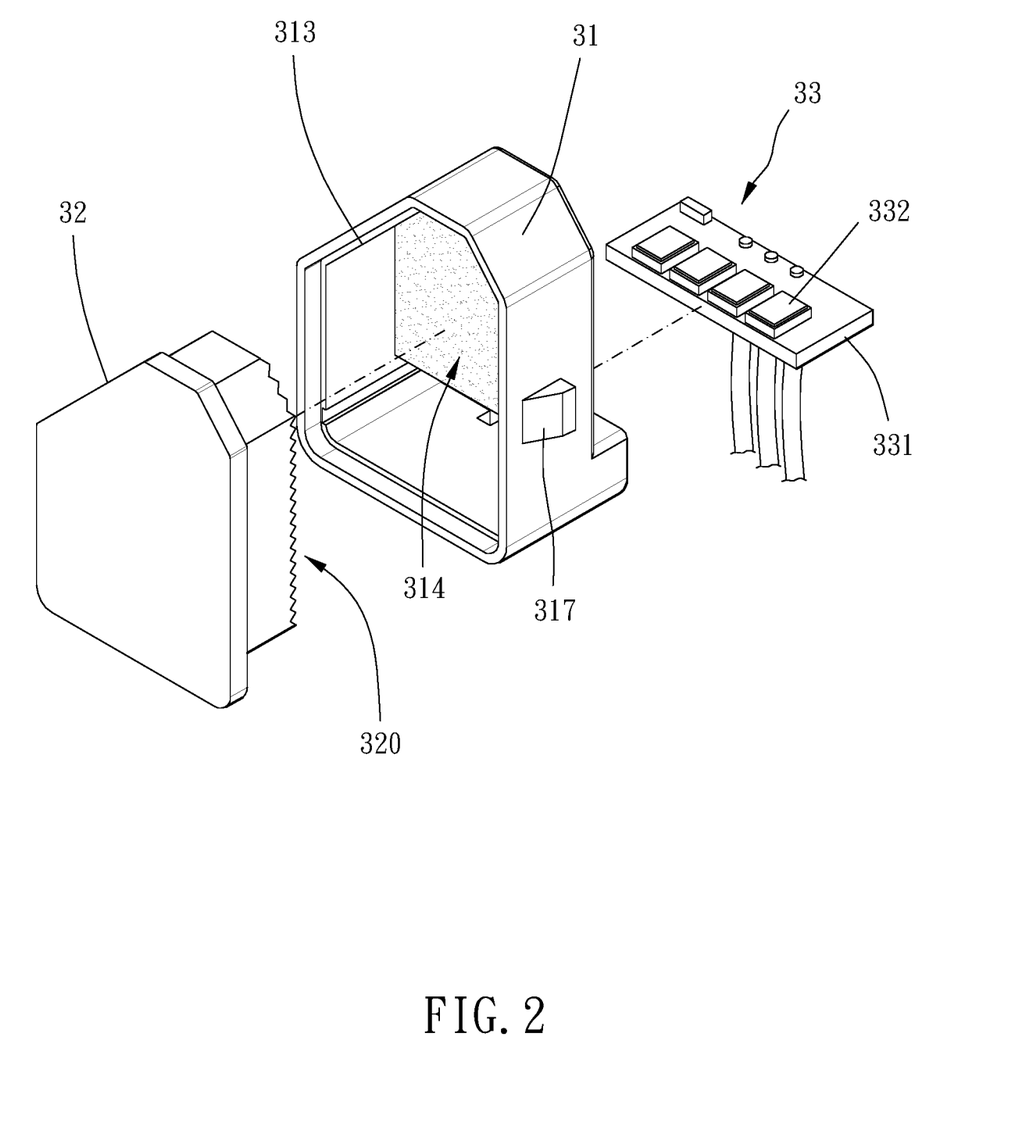
FIG. 2 is a breakdown drawing of the light emitting module of a preferable embodiment of the present invention.
Figure 3:
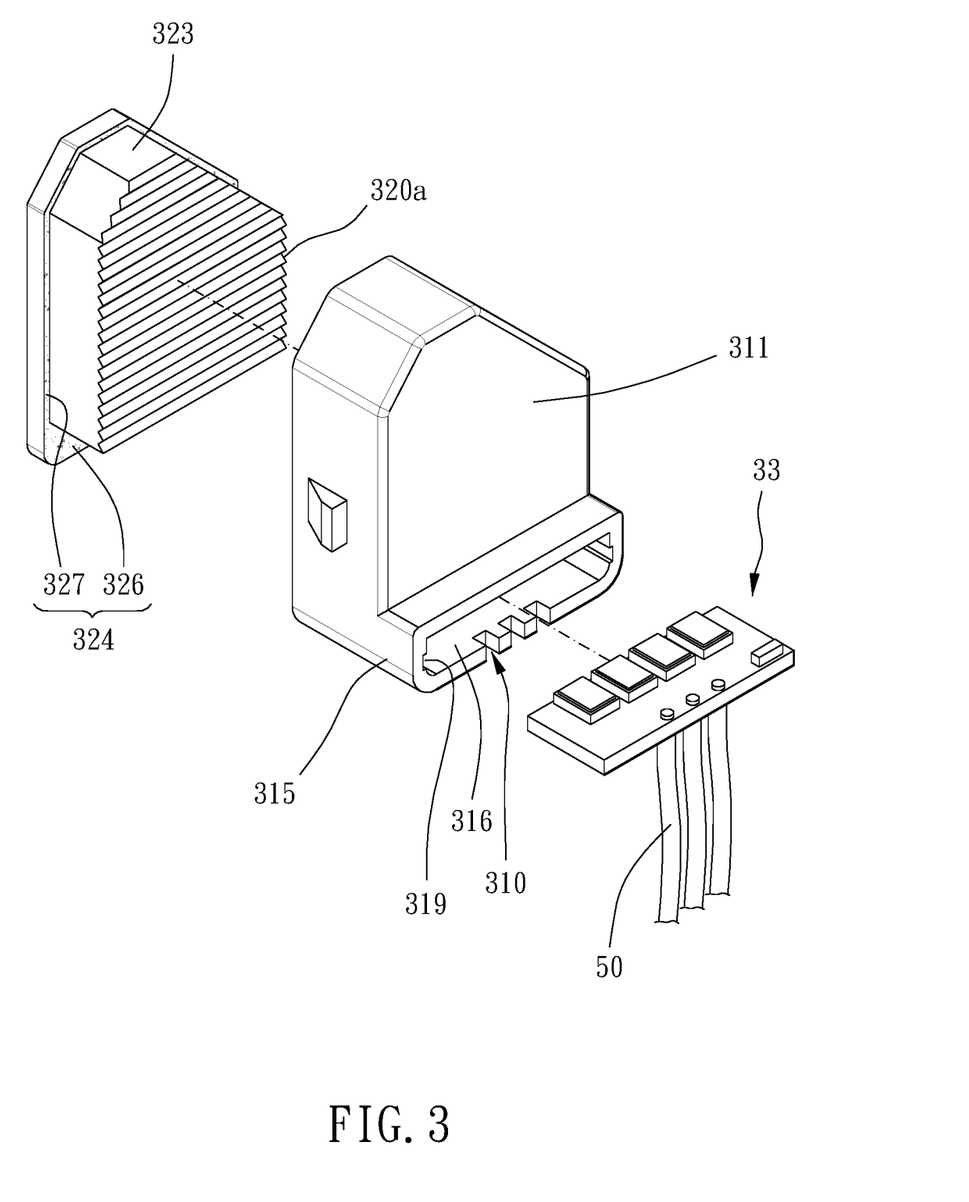
FIG. 3 is another breakdown drawing of the light emitting module of a preferable embodiment of the present invention.
Figure 4:
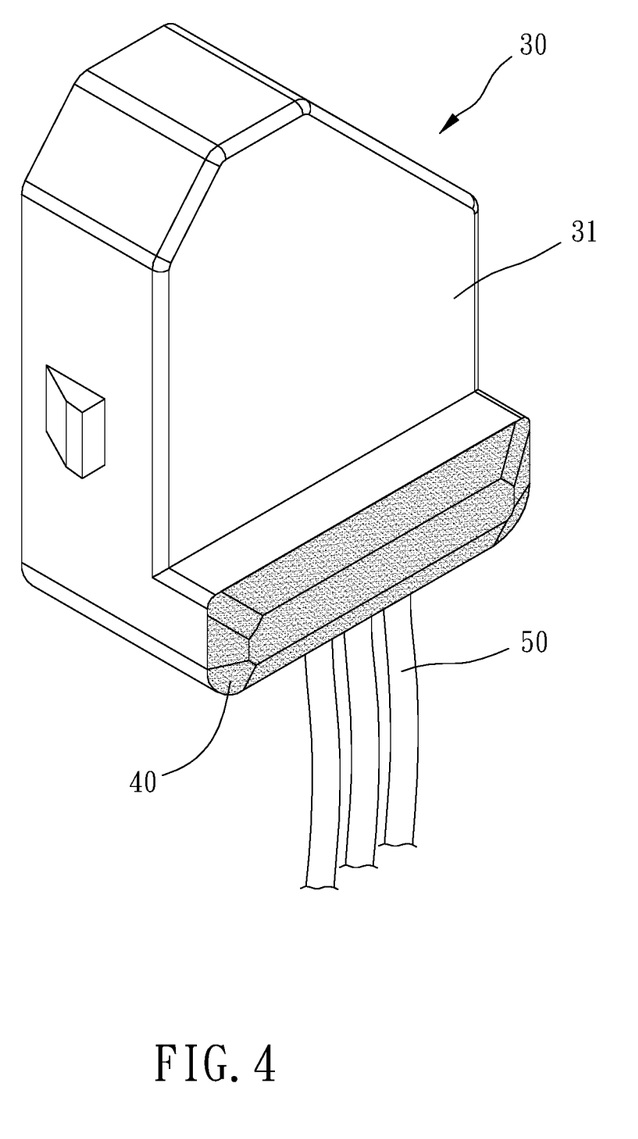
FIG. 4 is another stereogram of the light emitting module of a preferable embodiment of the present invention.
Figure 5:
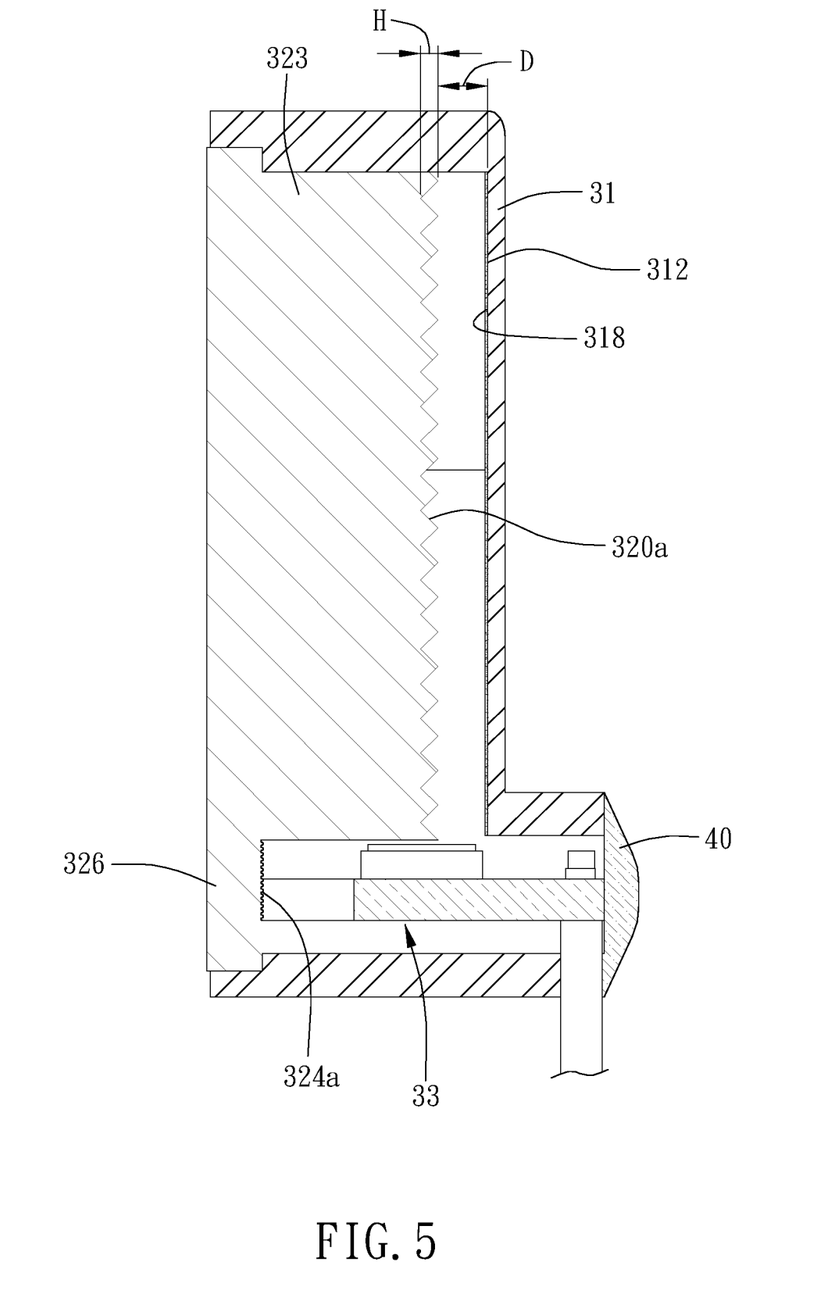
FIG. 5 is a cross-sectional view of the light emitting module of a preferable embodiment of the present invention.
Figure 6:
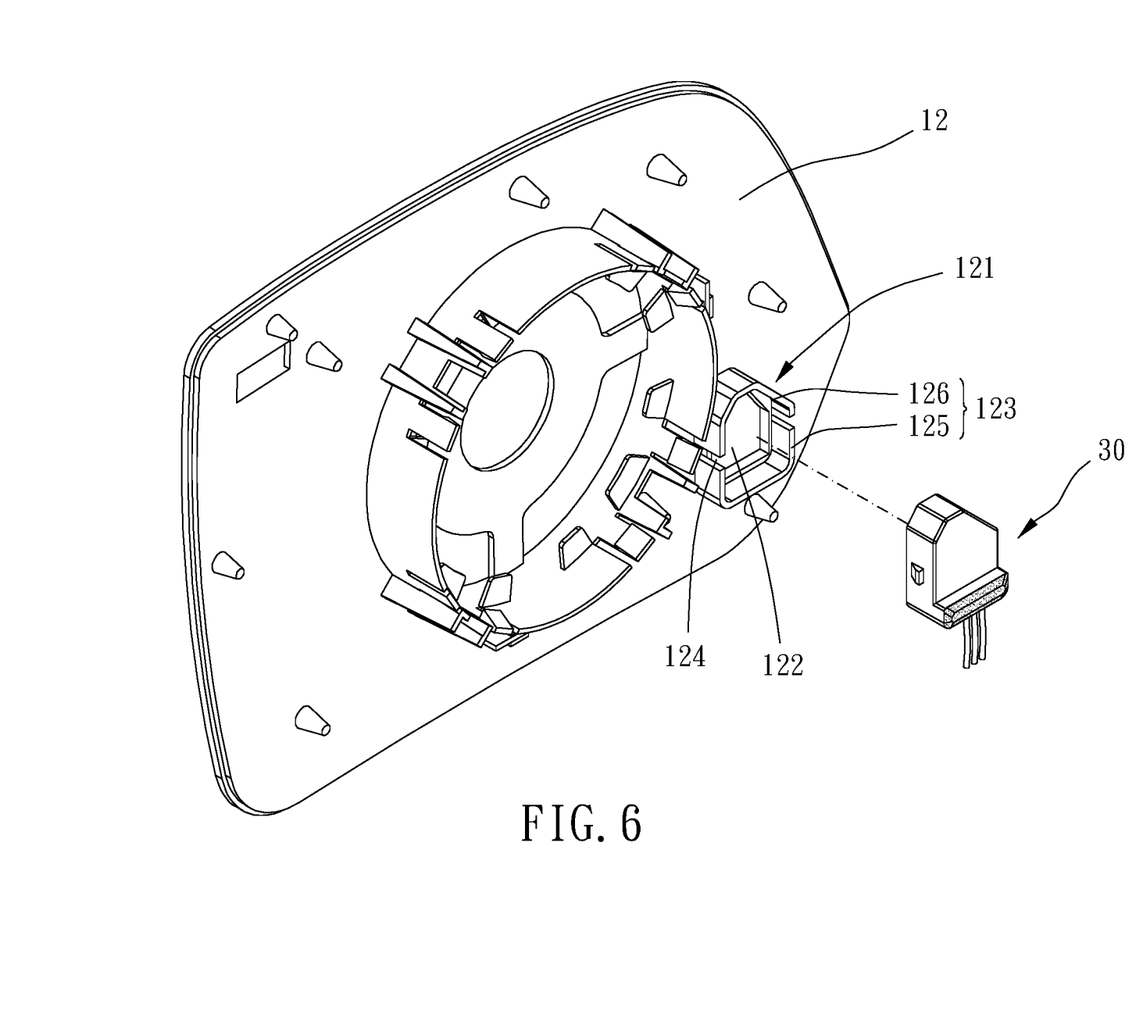
FIG. 6 is a partial breakdown drawing of a vehicle rearview mirror assembly of a preferable embodiment of the present invention.
Figure 7:
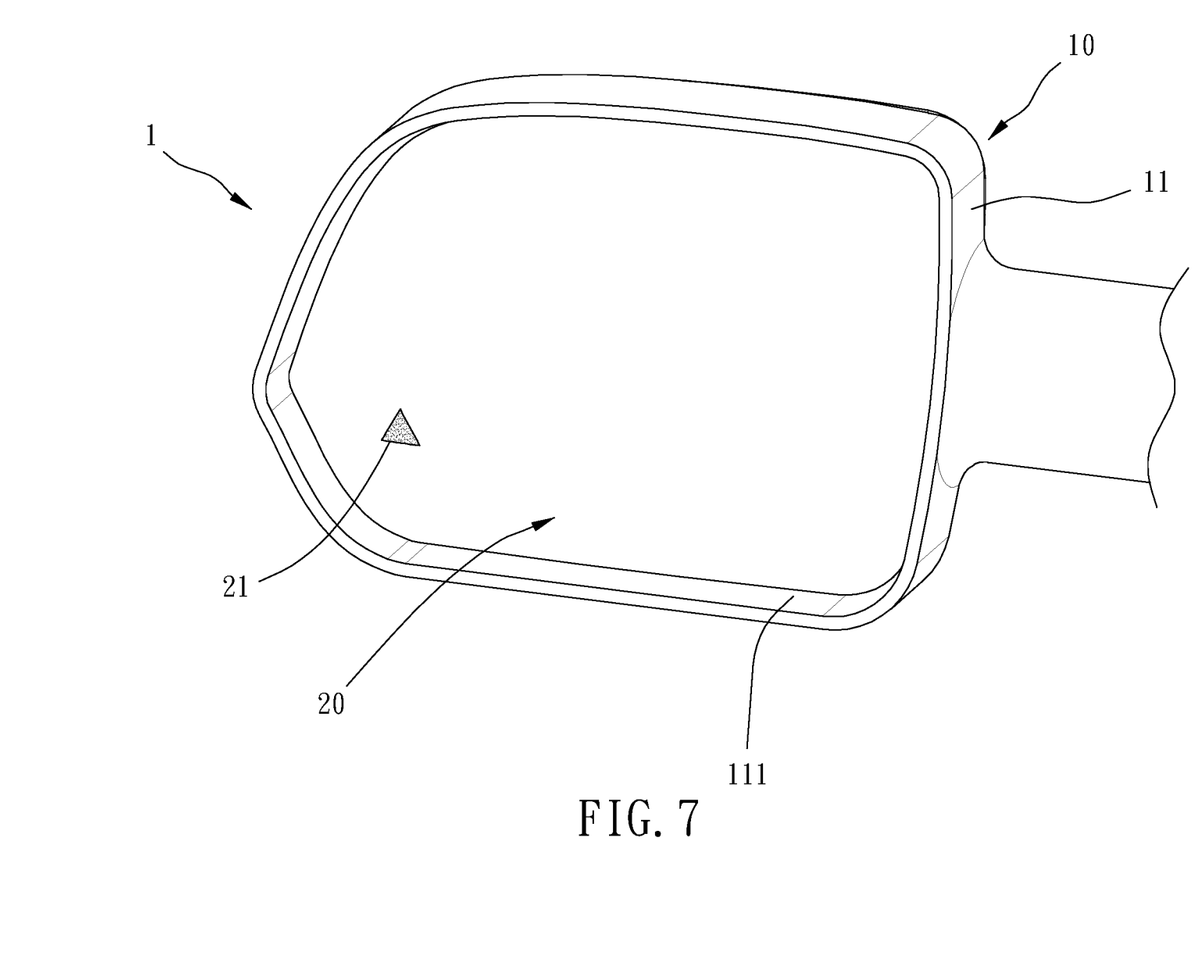
FIG. 7 is a drawing showing the vehicle rearview mirror assembly of a preferable embodiment of the present invention.

Please refer to FIGS. 1 to 7 for a preferable embodiment of the present invention. A vehicle rearview mirror assembly 1 of the present invention includes a casing 10, a mirror 20 and a light emitting module 30.

The casing 10 includes a first shell body 11 and a mounting board 12, the first shell body 11 has a first opening 111, the mounting board 12 includes an attachment portion 121, the mounting board 12 is connected to the first shell body 11 and covers the first opening 111, and the attachment portion 121 includes an aperture 122. The mirror 20 is attached to a side of the mounting board 12 opposite to the first opening 111, and the mirror 20 includes a light-penetrable patterned portion 21 spatially corresponding to the aperture 122, wherein the light-penetrable patterned portion 21 allows the light from the light emitting module 30 to project out for alarming. The light emitting module 30 is mounted to the attachment portion 121 and includes a second shell body 31, a light guide 32 and a light source 33. The second shell body 31 includes a rear portion 311 which includes an inner surface 312 facing toward the aperture 122 and a second opening 313, and the light guide 32 is connected to the second shell body 31 and covers the second opening 313. The inner surface 312 includes a reflection surface 314 which face the light guide 32, the light guide 32 includes a prismatic surface 320 facing the reflection surface 314, and the rear portion 311 further includes an annular wall 315 which is located adjacent to a bottom of the second shell body 31 and defines an insertion slot 316 through the rear portion 311. The light source 33 includes a circuit board 331 and at least one light emitting member 332 disposed on the circuit board 331 and facing away from the bottom of the second shell body 31, the circuit board 331 is inserted through the insertion slot 316 and engaged within the annular wall 315, and a binding member 40 secures the circuit board 331 to the annular wall 315 and seals the insertion slot 316, which prevents moisture from entering the light emitting module 30. Whereby, it can show a customized pattern with a larger area on the mirror 20 and provides good reliability and durability. Preferably, the light source 33 includes a plurality of light emitting members each capable of generating light in at least one color. It is noted that the light source 33 may provide light in one single color by one single light emitting member or plural light emitting members, or the light source 33 may provide light in multi colors by one single light emitting member or plural light emitting members.

The mounting board 12 further includes a projecting wall 123, and the projecting wall 123 projects upright and is arranged around the aperture 122 and disposed around the second shell body 31 and the light guide 32. The projecting wall 123 includes at least one side slot 124, the second shell body 31 includes at least one side bump 317, and the at least one side bump 317 is disposed within the at least one side slot 124, so that the light emitting module 30 can be attached (by ultrasonic welding, gluing or the like) to the mounting board 12 easily and firmly. In this embodiment, the at least one side slot includes two side slots 124, and the projecting wall 123 further includes a U-shaped section 125 and a V-shaped section 126 which are separated by the two side slots 124, so that it is advantageous for mounting and securing the light emitting module 30. The inner surface 312 may be coated with a reflection layer 318 which includes the reflection surface 314 (relatively high reflectivity), or the reflection surface 314 may be integrally formed as a part of the inner surface 312 (relatively low reflectivity).

Specifically, the annular wall 315 projects beyond the projecting wall 123, and the annular wall 315, preferably, projects beyond an outer surface of the rear portion 311 in a direction away from the light guide 32, which prevents the second shell body 31 form being impacted or damaged. The insertion slot 316 is preferably elongate and substantially rectangular. The annular wall 315 includes two grooves 319 disposed on opposing sides of the annular wall 315, two ends of the circuit board 331 are inserted within the two grooves 319 respectively, and thus the circuit board 331 can be quickly and stably mounted to the annular wall 315. Preferably, the light guide 32 is made of acrylic, and the light guide 32 includes light diffusing agent therein for increasing the light diffusivity of the light guide 32 and providing a surface light source 33 of a large area. In this embodiment, a plurality of notches 310 are disposed on an end of the annular wall 315 facing away from the light guide 32, a plurality of wires 50 are electrically connected to the light source 33 and received within the plurality of notches 310, and the binding member 40 secures the plurality of wires 50 to the annular wall 315 and seals the plurality of notches 310, wherein the notches 310 restrict the wires 50 and the binding member 40 secures the wires 50 so that the wires 50 and the light source 33 are prevented from being disconnected.

The prismatic surface 320 includes a plurality of prism ribs 320a arranged in parallel, and the plurality of prism ribs 320a are arranged in parallel to the bottom of the second shell body 31. Preferably, there is a fixed distance D between each of the plurality of prism ribs 320a and the inner surface 312, and the fixed distance D is less than 3.0 times a height H of each of the plurality of prism ribs 320a. In this embodiment, the light guide 32 includes a body plate 323 and an annular plate 324 which is connected with and surrounds the body plate 323, the body plate 323 includes the prismatic surface 320, the body plate 323 and the annular plate 324 form a right angle structure extending annularly between the body plate 323 and the annular plate 324, the body plate 323 is received within the second shell body 31, and the annular plate 324 is engaged with the second shell body 31, wherein, preferably, an inner surface of the annular plate 324 includes a rugged surface 324a facing the insertion slot 316, and an outer surface of the light guide 32 is a smooth surface.

The annular plate 324 includes a lower rectangular section 326 and a V-shaped section 327 connected to the lower rectangular section 326, the lower rectangular section 326 corresponds to the insertion slot 316 and has an area equal to or larger than an area of the insertion slot 316, and the lower rectangular section 326 includes the rugged surface 324a. The lower rectangular section 326 and the V-shaped section 327 of the annular plate 324 are configured to match with the U-shaped section 125 and the V-shaped section 126 of the projecting wall 123, for good engagement, combination and sealing thereof, thus preventing moisture from entering the light emitting module 30.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A vehicle rearview mirror assembly, including:
   a casing including a first shell body and a mounting board, the first shell body having a first opening, the mounting board including an attachment portion, the mounting board being connected to the first shell body and covering the first opening, the attachment portion including an aperture;
   a mirror attached to a side of the mounting board opposite to the first opening, and including a light-penetrable patterned portion spatially corresponding to the aperture;
   a light emitting module mounted to the attachment portion and including a second shell body, a light guide and a light source, the second shell body including a rear portion which includes an inner surface facing toward the aperture and a second opening, the light guide being connected to the second shell body and covering the second opening, the inner surface including a reflection surface which faces the light guide, the light guide including a prismatic surface facing the reflection surface, the rear portion further including an annular wall which is located adjacent to a bottom of the second shell body and defines an insertion slot through the rear portion, the light source including a circuit board and at least one light emitting member disposed on the circuit board and facing away from the bottom of the second shell body, the circuit board being inserted through the insertion slot and engaged within the annular wall, and a binding member securing the circuit board to the annular wall and sealing the insertion slot.

2. The vehicle rearview mirror assembly of claim 1, wherein the mounting board includes a projecting wall, and the projecting wall projects upright and is arranged around the aperture and disposed around the second shell body and the light guide.

3. The vehicle rearview mirror assembly of claim 2, wherein the projecting wall includes at least one side slot, the second shell body includes at least one side bump, and the at least one side bump is disposed within the at least one side slot.

4. The vehicle rearview mirror assembly of claim 3, wherein the at least one side slot includes two side slots, and the projecting wall further includes a U-shaped section and a V-shaped section which are separated by the two side slots.

5. The vehicle rearview mirror assembly of claim 2, wherein the annular wall projects beyond the projecting wall.

6. The vehicle rearview mirror assembly of claim 1, wherein the insertion slot is elongate and substantially rectangular.

7. The vehicle rearview mirror assembly of claim 1, wherein the annular wall includes two grooves disposed on opposing sides of the annular wall, and two ends of the circuit board are inserted within the two grooves respectively.

8. The vehicle rearview mirror assembly of claim 1, wherein the light guide includes light diffusing agent therein.

9. The vehicle rearview mirror assembly of claim 1, wherein the prismatic surface includes a plurality of prism ribs arranged in parallel.

10. The vehicle rearview mirror assembly of claim 9, wherein the plurality of prism ribs are arranged in parallel to the bottom of the second shell body.

11. The vehicle rearview mirror assembly of claim 1, wherein the light guide includes a body plate and an annular plate which is connected with and surrounds the body plate, the body plate includes the prismatic surface, the body plate and the annular plate form a right angle structure extending annularly therebetween, the body plate is received within the second shell body, and the annular plate is engaged with the second shell body.

12. The vehicle rearview mirror assembly of claim 11, wherein an inner surface of the annular plate includes a rugged surface facing the insertion slot, and an outer surface of the light guide is a smooth surface.

13. The vehicle rearview mirror assembly of claim 12, wherein the prismatic surface includes a plurality of prism ribs, there is a fixed distance between each of the plurality of prism ribs and the inner surface of the rear portion.

14. The vehicle rearview mirror assembly of claim 13, wherein the fixed distance is less than 3.0 times a height of each of the plurality of prism ribs.

15. The vehicle rearview mirror assembly of claim 11, wherein the annular plate includes a lower rectangular section and a V-shaped section connected to the lower rectangular section, the lower rectangular section corresponds to the insertion slot and has an area equal to or larger than an area of the insertion slot, and the lower rectangular section includes a rugged surface.

16. The vehicle rearview mirror assembly of claim 1, wherein the inner surface is coated with a reflection layer which includes the reflection surface.

17. The vehicle rearview mirror assembly of claim 1, wherein a plurality of notches are disposed on an end of the annular wall facing away from the light guide, a plurality of wires are electrically connected to the light source and received within the plurality of notches, and the binding member secures the plurality of wires to the annular wall and seals the plurality of notches.

18. The vehicle rearview mirror assembly of claim 1, wherein the light guide is made of acrylic.

19. The vehicle rearview mirror assembly of claim 11, wherein the body plate is at least three times thicker than the annular plate.

20. The vehicle rearview mirror assembly of claim 1, wherein the annular wall projects beyond an outer surface of the rear portion in a direction away from the light guide.

* * * * *